United States Patent
Hyslop

(10) Patent No.: US 7,924,871 B2
(45) Date of Patent: Apr. 12, 2011

(54) CONTROL CHANNEL PRIORITY ACCESS SYSTEMS AND METHODS

(75) Inventor: Douglas Alan Hyslop, Vienna, VA (US)

(73) Assignee: Nextel Communications Inc., Reston, VA (US)

( * ) Notice: Subject to any disclaimer, the term of this patent is extended or adjusted under 35 U.S.C. 154(b) by 1373 days.

(21) Appl. No.: 10/995,500

(22) Filed: Nov. 24, 2004

(65) Prior Publication Data

US 2006/0111104 A1    May 25, 2006

(51) Int. Cl.
*H04J 3/02*    (2006.01)

(52) U.S. Cl. ..... 370/462; 370/444; 370/459; 455/404.1; 455/435.3; 455/510

(58) Field of Classification Search .................. 370/252, 370/329, 335, 348, 350, 458, 443, 448, 462, 370/450, 337, 349; 455/404.1, 435.1, 340.1, 455/450, 825.22, 510–512, 435.3, 464; 375/143, 375/245, 152

See application file for complete search history.

(56) References Cited

U.S. PATENT DOCUMENTS

| 5,790,551 | A  | * | 8/1998  | Chan ............................. 370/458 |
| 6,356,767 | B2 | * | 3/2002  | Froula .......................... 455/512 |
| 6,374,099 | B1 | * | 4/2002  | Bi et al. ..................... 455/404.1 |
| 6,567,396 | B1 | * | 5/2003  | Pohjanvouri et al. ......... 370/349 |
| 6,674,765 | B1 | * | 1/2004  | Chuah et al. .................. 370/458 |
| 6,859,440 | B1 | * | 2/2005  | Sonti et al. .................... 370/252 |
| 6,985,740 | B2 | * | 1/2006  | Shyy et al. .................... 455/453 |
| 7,003,303 | B2 | * | 2/2006  | Khawand et al. .......... 455/452.1 |
| 7,136,392 | B2 | * | 11/2006 | Wentink ........................ 370/445 |
| 7,733,896 | B2 | * | 6/2010  | Chuah et al. .................. 370/444 |
| 2002/0118661 | A1 | * | 8/2002 | Voce ............................. 370/337 |
| 2002/0173316 | A1 |   | 11/2002 | Jang et al. |

* cited by examiner

*Primary Examiner* — Aung S Moe
*Assistant Examiner* — Vinncelas Louis

(57) ABSTRACT

Methods and systems for priority access to control channels are provided. A mobile stations is assigned a user priority value. The mobile station selects a retry algorithm from a plurality of retry algorithms based on the assigned user priority value. Alternatively, the assigned user priority value can be used as a seed value for a single retry algorithm. Mobile stations with higher priority values will attempt to access the control channel within shorter time periods and more frequently than those with lower priority values.

28 Claims, 5 Drawing Sheets

CONTROL CHANNEL PRIORITY ACCESS SYSTEMS AND METHODS

BACKGROUND OF THE INVENTION

The mobility afforded by wireless communication networks has resulted in increased usage of such networks. Private wireless networks and cellular networks are two common types of wireless communication networks. Private wireless networks, also known as wireless local loop (WLL) networks, are commonly operated by public safety agencies, taxi services and delivery services. Private wireless networks typically operate over a limited range of frequencies and within limited geographic areas. In contrast, cellular networks typically operate over a larger number of frequencies and provide coverage over larger geographic areas.

Although conventional cellular networks may provide sufficient reliability for the average user, there are a number of deficiencies which prevent widespread adoption by public safety agencies. For wireline communication, public safety agencies can be provided with dedicated circuits and switches such that even when the Public Switched Telephone Network (PSTN) is overloaded with non-emergency traffic, communications between, and within, public safety agencies can still be completed. To provide reliability to wireless communications, public safety agencies typically employ private wireless networks which operate over frequencies reserved for public safety agencies.

Although these private radio networks reduce the likelihood that calls by public safety agencies are blocked from accessing the radio network, they are expensive to implement and maintain. For example, these networks typically require the use of specialized mobile stations which are more expensive than typical mobile stations, due to the relatively low demand for the specialized mobile stations compared to that of mass-produced mobile stations. As used herein, the term mobile station is intended to encompass any type of wireless communication device including wireless telephones, wireless Personal Digital Assistants (PDA), wireless pagers, portable computers with wireless modems and the like. Compared to cellular networks, private wireless networks are more likely to have dead spots where a radio signal cannot be received by the public safety agency worker's mobile station. These dead spots can be extremely hazardous to the public safety agency workers, e.g., a police officer requesting backup, and to the citizenry in general, e.g., a public safety agency worker requesting an ambulance or fire trucks.

One solution currently employed by cellular network operators to encourage use of their networks by public safety agencies is to provide public safety agencies priority access to traffic channels. This typically involves mobile stations used by public safety agencies transmitting a priority indication to the cellular network during a traffic channel request. The cellular network recognizes the priority indication and will grant the public safety agency worker's mobile station access to the first available traffic channel. In some cellular networks when there are no available traffic channels, the cellular network will drop an existing call to make available a traffic channel for the public safety agency worker.

Although these conventional techniques provide public safety agency workers with priority access to traffic channels, they do not address the ability of the public safety agency worker to request access to the traffic channels during periods of congestion on the network. Accordingly, it would be desirable to provide methods and systems for reducing the time, and increasing the likelihood that, traffic channels are granted to public safety agency workers.

SUMMARY OF THE INVENTION

A system and method for priority access to control channels are disclosed. When a collision occurs for a mobile station accessing a control channel, the mobile station determines its user priority value. Based on the determined user priority value the mobile station selects a retry algorithm from a plurality of retry algorithms for determining the number of retry access requests and the frequency of such requests. Alternatively, the mobile station uses the user priority value as a seed value for a single retry algorithm. Users with higher user priority values will perform more access requests and the access requests will occur more frequently than users with lower user priority values.

DETAILED DESCRIPTION OF THE PREFERRED EMBODIMENTS

To decrease the time for, and increase the likelihood that, a traffic channel is granted to public safety workers, exemplary embodiments of the present invention address how public safety workers' mobile stations request traffic channels. In conventional cellular networks requests for traffic channels occur by sending an access request to the cellular network over a Random Access Channel (RACH). As the name implies, the RACH is not reserved, and hence, collisions can occur during attempts to access the channel.

In conventional cellular networks, mobile stations transmit an access request for a traffic channel on the RACH. The mobile station waits for a predetermined period of time for a reply from the base station. The predetermined period of time typically corresponds to the period of time between the occurrence of the RACH and the occurrence of the next common control channel (CCCH) where access request responses are transmitted from the base station. If an access request response is not received from the base station, the mobile station assumes that a collision with another mobile station has occurred during the RACH time interval. The mobile station then waits for a random time interval before transmitting the access request again. The random time interval is calculated using an algorithm equipped with a random number generator. Because both mobile stations are waiting a random amount of time before reattempting an access request, the mobile station are less likely to select the same RACH and collide again.

If additional collisions occur, the mobile station waits for additional random time intervals and retries the access request. The mobile station will continue this process until a maximum number of access requests have been attempted. Once the maximum number of access requests have been attempted, the mobile station displays a network busy message to the subscriber. The maximum number of access requests is typically between 6 and 8. This maximum number is typically broadcast over a broadcast control channel (BCCH).

The use of a random delay interval reduces the likelihood of a collision between these two mobile stations when they retry sending the request on the RACH. However, when network congestion is high due to a large number of access requests on the RACH, e.g., during an emergency situation such as a natural disaster, there will be a high occurrence of collisions on the access requests. Repeated collisions will result in access failures. Because the network does not control access to the RACH by mobile stations, subscriber priority is not a factor in the access request to the RACH.

Figure 1A:
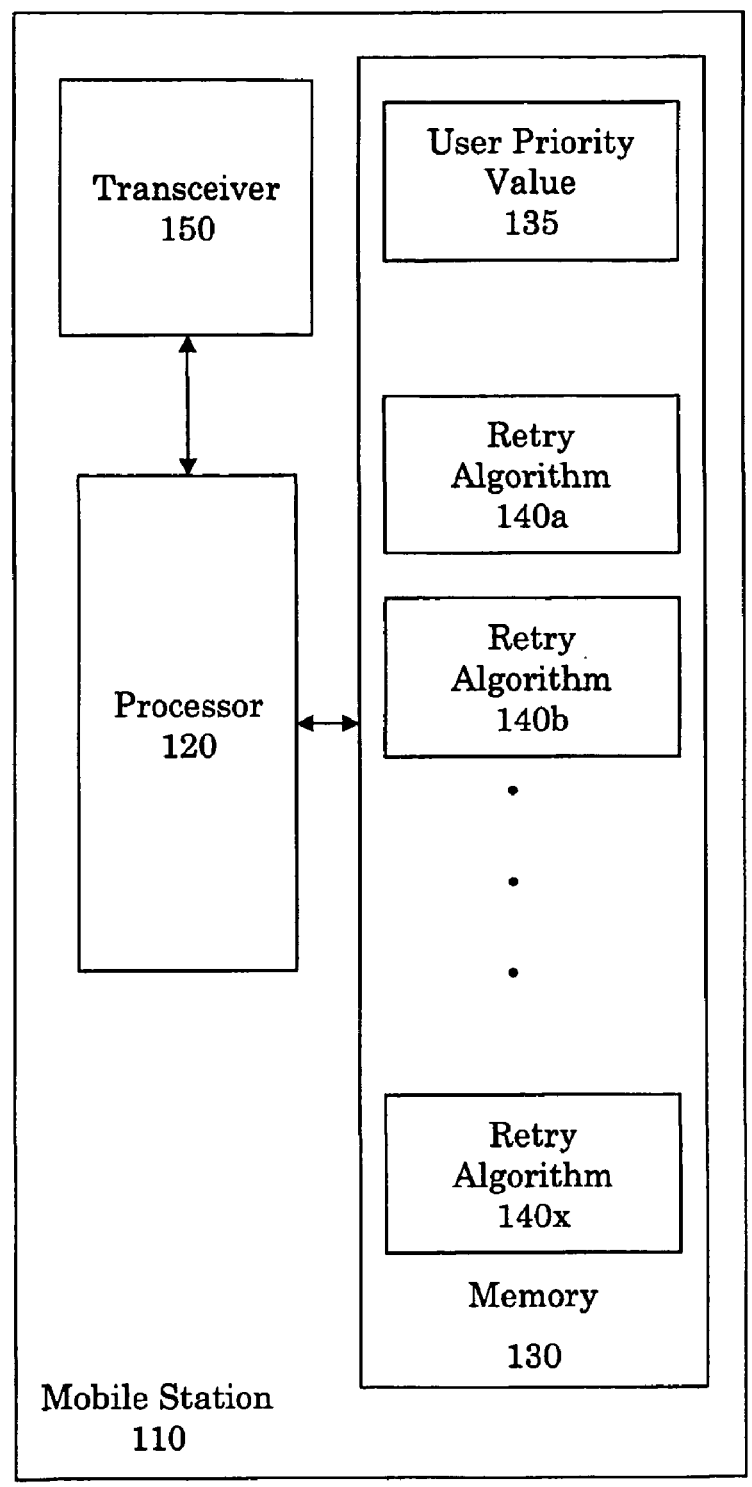
FIG. 1a illustrates a mobile station in accordance with an exemplary embodiment of the present invention.

To address the issues of the lack of priority in RACH requests, the present invention provides one or more retry algorithms which provide shorter intervals for retries and allow more access requests for public safety agency workers. FIG. 1a illustrates an exemplary mobile station in accordance with one embodiment of the present invention. In accordance with this embodiment, the mobile station 110 includes a processor 120, memory 130, and a transceiver 150. Processor 120 can be a microprocessor running under software control, an application specific integrated circuit (ASIC), a field programmable gate-array (FPGA), or the like. Memory 130 can be magnetic memory, flash memory, a hard disk drive, or the like. Although not illustrated, the mobile station will also include other components of conventional mobile stations, such as a keypad, display, antenna, analog-to-digital converters, and the like.

In accordance with this embodiment, the memory includes a user priority value 135, and two or more retry algorithms 140a-140x. The particular retry algorithm selected by the mobile station depends upon a user priority value 135. The user priority value 135 can be programmed into the mobile station when it is provisioned on the network, or can be hard-coded at the time of manufacture.

The retry algorithms 140a-140x are used for setting the retry timer, the expiration of which causes the mobile station to retry an access request on the control channel. While conventional retry algorithms are designed to minimize collisions, one or more of the retry algorithms 140a-140x are designed to reduce the time period between access requests. Accordingly, the retry algorithms are designed to retry access to the RACH within a smaller random interval then conventional algorithms. Additionally, one or more of the retry algorithms 140a-140x can also be designed to increase the number of retries compared to conventional retry algorithms which provide the same number of access requests for all mobile stations. Accordingly, higher user priority values 135, increase the number and frequency of access requests compared to lower values. The algorithms can also be designed to reduce collisions between mobile stations with the same user priority value, or between mobile stations with user priority levels within certain ranges of user priority values.

Figure 1B:
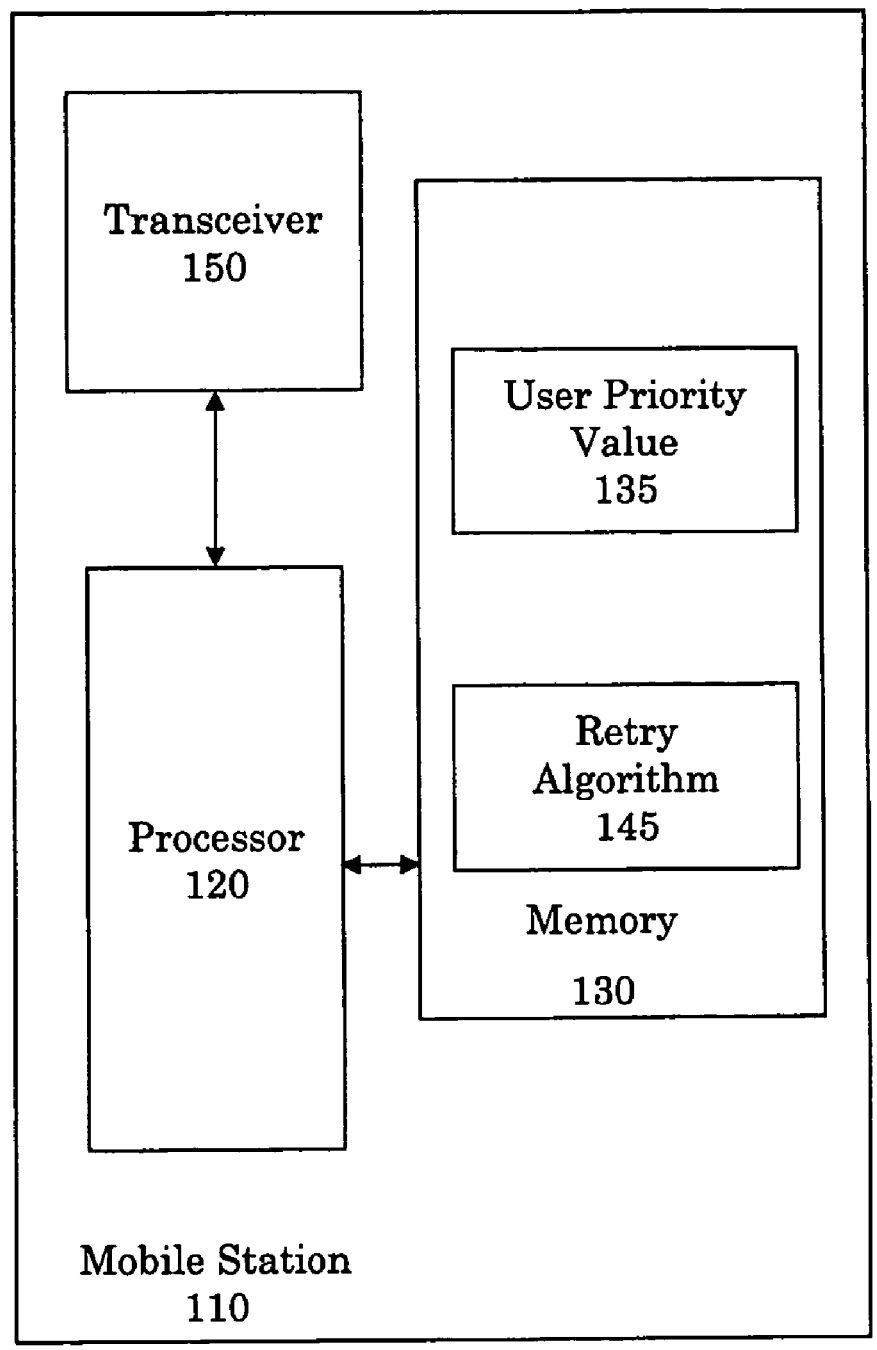
FIG. 1b illustrates a mobile station in accordance with another exemplary embodiment of the present invention.

FIG. 1b illustrates a mobile station in accordance with another embodiment of the present invention. The mobile station 110 in this embodiment is similar to that described in connection with FIG. 1a, except that instead of using a number of retry algorithms 140a-140x, a single retry algorithm 145 is used. The single retry algorithm 145 uses the user priority value 135 as a seed value for the algorithm such that higher priority values increase the number and frequency of access requests compared to lower priority values.

Figure 2A:
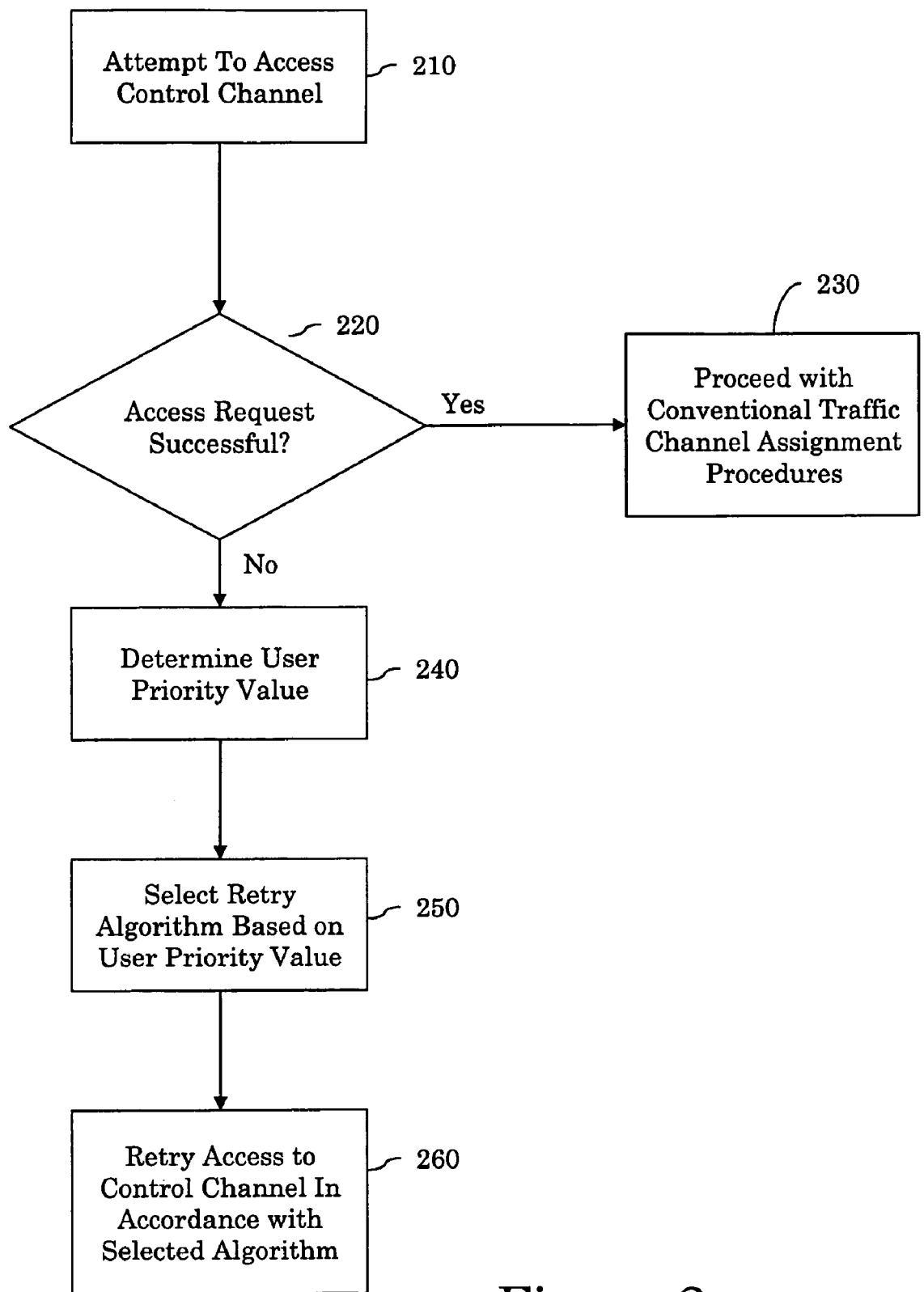
FIG. 2a illustrates an exemplary method for priority access to a control channel in accordance with the present invention.

FIG. 2a illustrates a method for accessing a control channel using the mobile station of FIG. 1a. After the mobile station attempts to access the control channel, e.g., the RACH, (step 210), the mobile station determines whether the access request was successful (step 220). If the mobile station determines that the access request was successful ("Yes" path out of decision step 220), the mobile station will proceed with conventional traffic assignment procedures. The mobile station will typically determine that its access request is successful by receipt of a traffic channel assignment (i.e., an access request grant) by the cellular network. Moreover, although not illustrated in FIG. 2a, the user priority value 135 can be sent as part of the access request and used by the system in the assignment of the traffic channel.

If the mobile station determines that the access request was not successful ("No" path out of decision step 220), then the mobile station will determine the user priority by accessing the user priority value stored in the memory (step 240). The mobile station will typically determine that an access request is not successful by not having received a traffic channel assignment within a predetermined amount of time. The mobile station then selects one of the plurality of retry algorithms based on the determined user priority value (step 250) and retries access to the control channel based on the selected algorithm (step 260). If the retry attempt on the control channel in step 260 is not successful, the mobile station will continue to retry access to the control channel as dictated by the selected algorithm, i.e., for the time interval between retry attempts and the number of attempts specified by the algorithm. The time interval between retries can be the same as the initially calculated value, or the mobile station can recalculate the interval after each unsuccessful attempt. Moreover, the mobile station can transmit a user priority value with the access request and the network can use the user priority value when determining whether, and how, to grant a traffic channel to the mobile station.

Figure 2B:
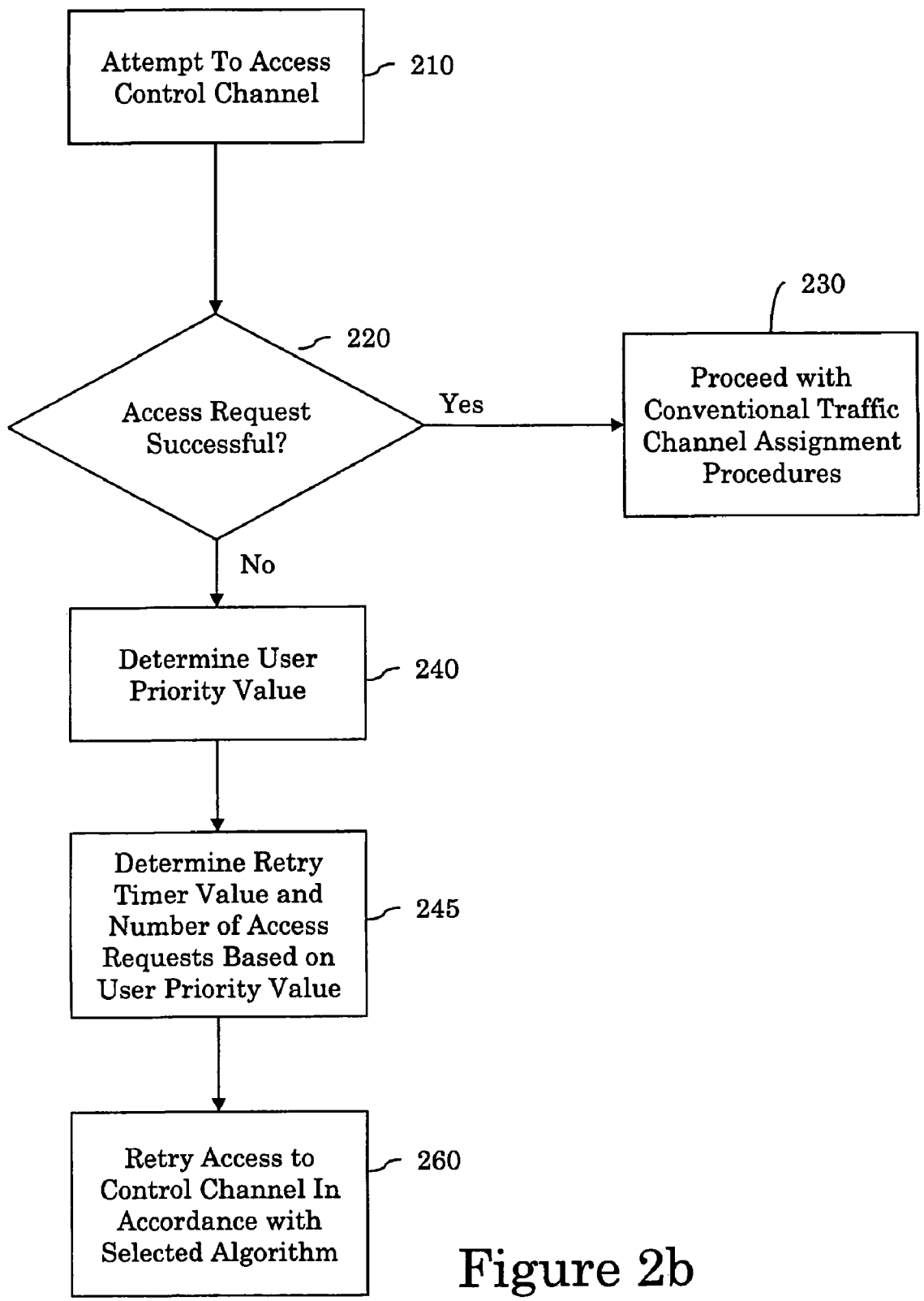
FIG. 2b illustrates another exemplary method for priority access to a control channel in accordance with the present invention.

FIG. 2b illustrates a method for accessing a control channel using the mobile station of FIG. 1b. This method is similar to that described above with respect to FIG. 2a, except that instead of selecting a retry algorithm based on a user priority value (step 250), in the method of FIG. 2b the retry timer value and number of access requests are determined using the same algorithm regardless of user priority values. In the method of FIG. 2b, the user priority values are used as a seed value in the same algorithm as discussed above in connection with FIG. 1b.

As described above, a base station typically broadcasts a parameter on the BCCH which informs mobile stations of the maximum number of access request retries. This value does not typically change over time, but instead is provided to allow flexibility to network operators. Accordingly, implicit in the discussion of FIGS. 1a, 1b, 2a and 2b is that mobile stations of predetermined priority levels will ignore the parameter broadcast in the BCCH, and instead the mobile stations will rely upon a number of retries determined using the algorithm(s) stored in memory. Accordingly, when the number of access request collisions rises, for example due to a natural disaster, conventional systems will continue to be overwhelmed by access requests. As described below in connection with FIGS. 3a and 3b, one aspect of the present invention provides for modifying the maximum number of retry requests parameter in the BCCH.

Figure 3A:
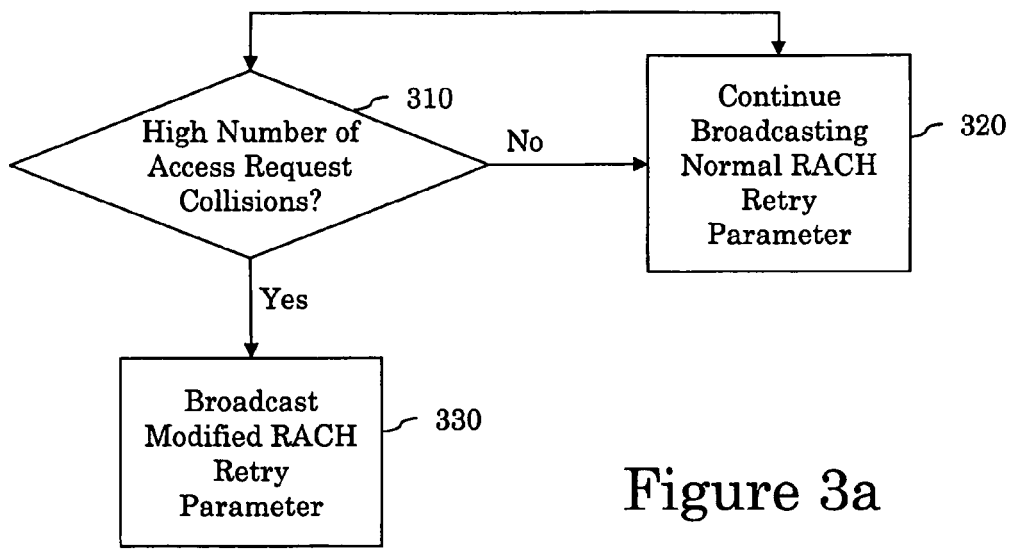
FIGS. 3a and 3b illustrate an exemplary method for priority access to a control channel in accordance with one aspect of the present invention.
Figure 3B:
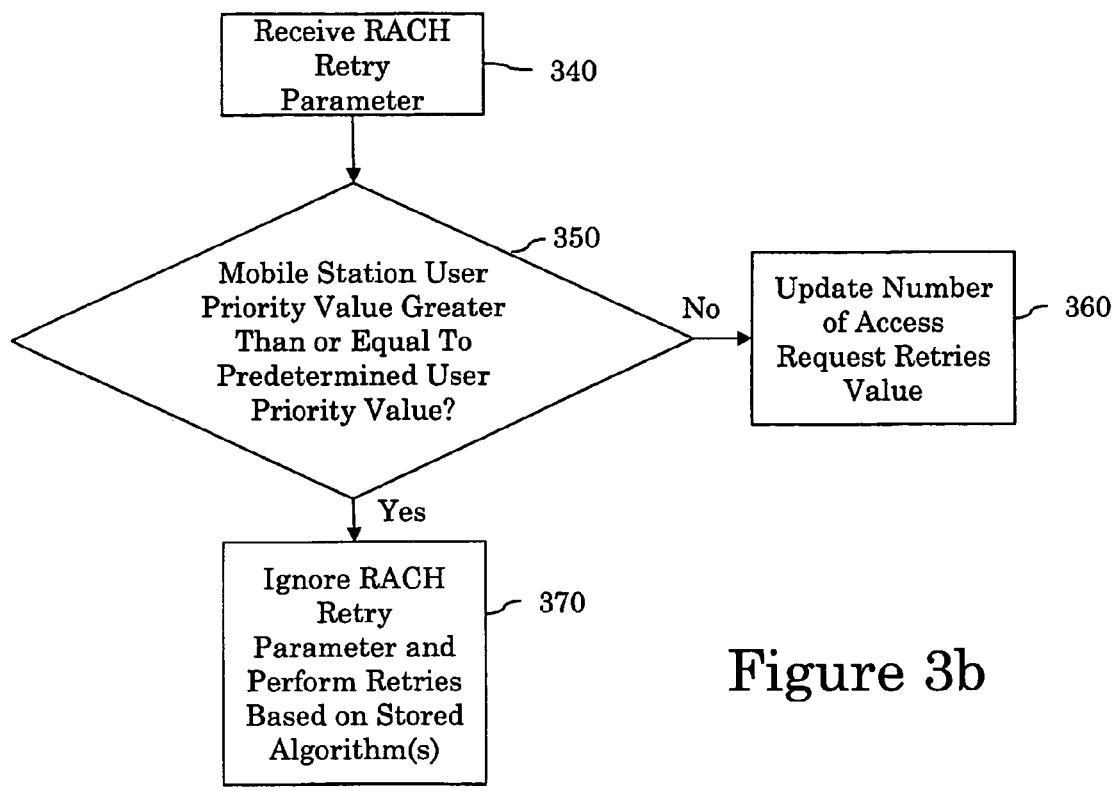

FIGS. 3a and 3b illustrate an exemplary method for priority access to a control channel in accordance with one aspect of the present invention. Specifically, FIG. 3a illustrates an exemplary method for a wireless network and FIG. 3b illustrates an exemplary method for a mobile station. The system monitors access requests and determines whether there are a high number of access request collisions (step 310). The monitoring can be performed at the base site, or performed within other portions of the wireless network. Base sites can detect collisions on the RACH by monitoring the time periods when requests are being transmitted and determining that the requests cannot be decoded due to interference, which typically indicates a collision. The number of access request collisions which would be considered as a high number of request collisions can be a preconfigured value based upon collected data of access requests for the entire network or can be a dynamically determined value based upon a trend of increases in access requests for the network as a whole or for the particular base station.

If the system does not detect a high number of access request collisions ("No" path out of decision step 310), then the base station continues to broadcast the normal RACH retry parameter. If, however, it is determined that there are a high number of access request collisions ("Yes" path out of decision step 310), then the base station broadcasts a modified RACH retry parameter, the modified parameter resulting in a smaller number of access request retries by mobile stations. Although FIG. 3a is described with a step of determining a high number of access request collisions (step 310), a network operator can configure the base station when the network operator determines that there is going be a high number of requests, for example when a disaster occurs.

As illustrated in FIG. 3b, when a mobile station receives a RACH retry parameter (step 340), the mobile station determines whether its user priority value is greater than or equal to a predetermined user priority value (step 350). If the mobile station's user priority value is less than a predetermined user priority value ("No" path out of decision step 350), then the mobile station will update its stored value for the number of access request retries (step 360). If, however, the mobile station's user priority value is greater than or equal to a predetermined user priority value ("Yes" path out of decision step 350), then the mobile station will ignore the RACH retry parameter and perform the number of access request retries as dictated by its stored algorithm(s).

It should be recognized that the method of FIG. 3b is merely exemplary, and that a mobile stations may not perform such a process. Specifically, both priority access and non-priority access mobile stations may not perform the determination set forth in step 350. Accordingly, mobile stations with priority access may simply be programmed to ignore any broadcast RACH retry parameters and instead rely upon the number of retries dictated by the stored algorithm(s). Additionally, mobile stations without priority access would simply update the number of access request retries when the BCCH updates the parameter.

Although the present invention has been described generically as access requests on a control channel, these access requests can be for voice interconnect, voice or data dispatch, or packet switched data calls. Additionally, a mobile station may be provided with different priority levels for different call types. Additionally, the particular retry algorithm can be influenced by both the user priority value and the type of call. Moreover, although the present invention has been described in connection with communication channels of a GSM network, the present invention is equally applicable to any type of network where there is a random access channel for requesting traffic channels.

The priority level assigned to a mobile station can be uniform for all workers of a particular public safety agency or can vary depending upon the importance of access for particular workers of the public safety agency. Additionally, different public safety agencies can be assigned different priority levels.

Although the present invention has been described in connection with providing different user priority values for workers of public safety agencies for accessing a control channel, the different priority levels can also be provided to non-public safety agency workers. For example, a cellular network operator can charge higher fees to users who desire higher priority access to the control channels. Moreover, a cellular network operator may decide to provide its own employees with higher priority access.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

What is claimed is:

1. A method for accessing a control channel, the method comprising the acts of:
   transmitting, from a mobile station, an access request to a base station;
   determining that the access request has not been granted;
   receiving an access request retry parameter indicating a first maximum number of access request retries;
   comparing a user priority value of the mobile station with a predetermined user priority value,
      wherein when the user priority value of the mobile station is less than the predetermined user priority value, updating a stored value in the mobile station for a maximum number of access request retries according to the received access request retry parameter and performing access requests based on the updated maximum number of access request retries, and
      wherein when the user priority value associated with the mobile station is greater than or equal to the predetermined user priority value, ignoring the access request retry parameter, determining based on a stored algorithm a second maximum number of access request retries which is greater than the first maximum number of access request retries, and performing access requests based on the second maximum number of access request retries.

2. The method of claim 1, wherein the requests are associated with traffic channel requests and the access request retry parameter specifies a maximum number of access request retries for the traffic channel request.

3. The method of claim 2, further comprising setting a retry timer, wherein setting the retry timer comprises the acts of:
   selecting a retry algorithm based upon the user priority value associated with the mobile station; and
   setting the retry timer using the selected retry algorithm.

4. The method of claim 2, further comprising setting a retry timer, wherein setting the retry timer comprises the act of:
   inputting the priority value associated with the mobile station into a retry algorithm, wherein the retry algorithm outputs a time period for the retry timer.

5. The method of claim 2, wherein the determination that the access request has not been granted is based on not receiving an access request response.

6. The method of claim 2, wherein the access request is for a voice, video, or data communication.

7. The method of claim 2, wherein mobile stations with higher user priority values have shorter time periods for a retry timer.

8. The method of claim 2, wherein the mobile station is associated with a group of mobile stations with the same associated priority.

9. The method of claim 2, wherein the user priority value associated with the mobile station is used in a determination of whether to grant the access request.

10. The method of claim 2, wherein the mobile station transmits up to a maximum number of access requests until an access request response is received.

11. A mobile station comprising:
a transmitter which transmits an access request to a base station and receives an access request retry parameter indicating a first maximum number of access request retries;
a processor which determines that the access request has not been granted and compares a user priority value of the mobile station with a predetermined user priority value to a user priority value,
wherein when the user priority value of the mobile station is less than the predetermined user priority value, updating a stored value in the mobile station for a maximum number of access request retries according to the received access request retry parameter and performing access requests based on the updated maximum number of access request retries, and
wherein when the user priority value associated with the mobile station is greater than or equal to the predetermined user priority value, ignoring the access request retry parameter, determining based on a stored algorithm a second maximum number of access request retries which is greater than the first maximum number of access request retries, and performing access requests based on the second maximum number of access request retries; and
a memory which stores the priority value associated with the mobile station.

12. The mobile station of claim 11, wherein the access requests are associated with traffic channel requests and the access request retry parameter specifies a maximum number of access request retires for the traffic channel request.

13. The mobile station of claim 12, wherein the processor selects a retry algorithm based upon the user priority value associated with the mobile station and sets a retry timer using the selected retry algorithm.

14. The mobile station of claim 12, wherein a retry timer is set by inputting the user priority value associated with the mobile station into a retry algorithm, wherein the algorithm outputs a time period for the retry timer.

15. The mobile station of claim 12, wherein the access request is for a voice, video, or data communication.

16. The mobile station of claim 12, wherein the priority value associated with the mobile station is used in a determination of whether to grant the access request.

17. The mobile station of claim 12, wherein the mobile station transmits up to a maximum number of access requests until an access request response is received.

18. A mobile station comprising:
a transmission unit for transmitting an access request to a base station;
a determination unit for determining that the access request has not been granted;
a reception unit for receiving an access request retry parameter indicating a first maximum number of access requests;
a comparison unit for comparing a user priority value of the mobile station with a predetermined user priority value to a user priority value associated with the mobile station,
wherein when the user priority value of the mobile station is less than the predetermined user priority value, a maximum number of access request retries stored in the mobile station is updated according to the received access request retry parameter and access request are performed based on the updated maximum number of access request retries, and
wherein when the user priority value associated with the mobile station is greater than or equal to the predetermined user priority value, the access request retry parameter is ignored, a second maximum number of access request retries is determined based on a stored algorithm which is greater than the first maximum number of access request retries, and access requests are performed based on the second maximum number of access request retries; and
a storage unit for storing the priority value associated with the mobile station.

19. The mobile station of claim 18, wherein the requests are associated with traffic channel requests and the access request retry parameter specifies a maximum number of access request retries for the traffic channel request.

20. The mobile station of claim 19, wherein the means for determining selects a retry algorithm based upon the user priority value associated with the mobile station and sets a retry timer using the selected retry algorithm.

21. The mobile station of claim 19, wherein a retry timer is set by inputting the user priority value associated with the mobile station into a retry algorithm, wherein the algorithm outputs a time period for the retry timer.

22. The mobile station of claim 19, wherein the access request is for a voice, video, or data communication.

23. The mobile station of claim 19, wherein the user priority value associated with the mobile station is used in a determination of whether to grant the access request.

24. The mobile station of claim 19, wherein the mobile station transmits up to a maximum number of access requests until an access request response is received.

25. A method for accessing a control channel, the method comprising the acts of:
receiving, by a mobile station, an access request retry parameter from a base station, the access request retry parameter indicating a first maximum number of access request retries;
comparing a user priority value of the mobile station with a predetermined user priority value,
wherein when the user priority value of the mobile station is less than the predetermined user priority value, updating a stored value in the mobile station for a maximum number of access request retries according to the received access request retry parameter, and
wherein when the user priority value associated with the mobile station is greater than or equal to the predetermined user priority value, ignoring the access request retry parameter, determining based on a stored algorithm a second maximum number of access request retries which is greater than the first maximum number of access request retries; and
performing a traffic channel access request based on the first maximum number of access request retries or the second maximum number of access request retries, wherein the traffic channel access request comprises the acts of transmitting, by the mobile station, up to the first or second maximum number of access requests with a time period between access requests until an access request response is received, wherein the a time period between access requests is based upon the user priority value associated with the mobile station.

26. The method of claim 25, wherein the maximum number of access requests transmitted by the mobile station is determined based upon an algorithm stored in the mobile station.

27. The method of claim 25, further comprising the acts of:
selecting a retry algorithm based upon the user priority value associated with the mobile station; and
determining the time period using the selected retry algorithm.

28. The method of claim 25, further comprising the acts of:
inputting the user priority value associated with the mobile station into a retry algorithm, wherein the retry algorithm outputs a value for the time period.

* * * * *